United States Patent [19]
Citta

[11] Patent Number: 5,162,900
[45] Date of Patent: Nov. 10, 1992

[54] CO-CHANNEL INTERFERENCE FILTER FOR TELEVISION RECEIVER

[75] Inventor: Richard W. Citta, Oak Park, Ill.

[73] Assignee: Zenith Electronics Corporation, Glenview, Ill.

[21] Appl. No.: 784,334

[22] Filed: Oct. 29, 1991

Related U.S. Application Data

[63] Continuation-in-part of Ser. No. 600,469, Oct. 19, 1990, Pat. No. 5,132,797.

[51] Int. Cl.$^5$ .............................................. H04N 5/21
[52] U.S. Cl. ...................................... 358/167; 358/31; 358/86; 375/101; 455/307
[58] Field of Search ...................... 358/167, 31, 86, 83; 375/101, 103, 12, 14; 455/63, 296, 307, 308

[56] References Cited

U.S. PATENT DOCUMENTS

| | | | |
|---|---|---|---|
| 3,742,131 | 6/1973 | Rogeness | 455/6 |
| 4,032,847 | 6/1977 | Unkauf | 375/101 |
| 4,216,496 | 8/1980 | Lothian et al. | 358/83 |
| 4,343,019 | 8/1982 | Lagoni | 358/31 |
| 5,067,137 | 11/1991 | Kaneko | 333/18 |

Primary Examiner—Victor R. Kostak
Assistant Examiner—Jeffrey S. Murrell

[57] ABSTRACT

A television signal receiver includes a comb filter having a plurality of spaced nulls for reducing undesired co-channel interference. The depth of the nulls is established in response to a control signal representing the strength of the undesired co-channel interference to provide an optimized tradeoff between interference attenuation and signal-to-noise degradation. The control signal is preferably generated in response to a received reference signal such as a pseudo random channel equalization code. The output of the comb filter is characterized by an intersymbol interference component which is canceled is an intersymbol interference filter which is also responsive to the control signal.

13 Claims, 3 Drawing Sheets

CO-CHANNEL INTERFERENCE FILTER FOR TELEVISION RECEIVER

CROSS REFERENCE TO RELATED APPLICATION

This is a continuation-in-part of co-pending application Ser. No. 600,469, filed Oct. 19, 1990 now U.S. Pat. No. 5,132,797 issued 7/21/92.

FIELD OF THE INVENTION

This invention relates generally to television receivers and in particular to systems for reducing the effects of co-channel interference in received television signals.

BACKGROUND OF THE INVENTION

The standard NTSC color television broadcast system adopted in the United States by the Federal Communications Commission provides a six megahertz bandwidth for each television broadcast channel. Within this six megahertz bandwidth, broadcasters must provide video, color and sound information together with several synchronizing signals. The latter are required to enable the television receiver to properly display the picture information as originally modulated at the transmitter.

The use of conventional information processing by television broadcast and receiving systems involves the modulation of analog information signals upon one or more carrier signals for broadcast. This analog signal processing together with the limited bandwidth available for each television broadcast channel limits the maximum frequency response of picture information which may be transmitted and received. This limited frequency response results in a limitation of the resolution o picture definition of the displayed television picture. Within these constraints, manufacturers of television receivers have adopted a variety of picture information processing and display techniques to enhance the perceived definition or resolution of the displayed television picture.

While the effort by television manufacturers to provide such enhanced resolution has provided considerable improvement, there exists a continuing desire to further improve television picture quality. This continuing desire has motivated practitioners in the television arts to undertake the development of a variety of high definition television systems. One of the fundamentals applied to such high definition television system development is the need to process higher frequency picture information. One possible solution involves expanding the available bandwidth of the television broadcast channels. While such a system is technologically direct, its implementation is considered impractical given the proliferation of standard NTSC signal stations and television receivers. Another possible approach involves compressing a wideband video signal while maintaining the present six megahertz broadcast channel bandwidth. In this regard, transmission of the compressed signal in digital form is generally preferred since improved noise performance is provided relative to conventional analog transmission. That is, any noise picked up in the digital transmission of the encoded signals will not be reproduced if the discrete levels of the digital transmission can be accurately resolved in the receiver. However, in digital transmission, excessive noise or interference can result in total loss of picture if the digital levels cannot be resolved, in contrast to analog where the picture is gradually degraded.

While the structures of high definition television systems may vary, a typical wideband system uses a high frequency analog video source having a bandwidth in excess of thirty megahertz for picture information. The broad bandwidth video information is converted from analog to digital information by conventional analog to digital conversion. Thereafter, digital signal processing techniques are utilized to perform one or more data compression operations to provide a signal capable of being digitally transmitted within the available six megahertz bandwidth. This digitally encoded signal is used to modulate an assigned television broadcast carrier.

At the receiver, a generally conventional tuner, intermediate frequency amplifier, and picture detector recover the digitally encoded signal in much the same manner as a conventional NTSC receiver. Thereafter, decompression systems produce a representation of the original compressed signal after which a digital to analog converter converts the digitally encoded signal to a wideband analog picture information signal. This analog signal is then processed for display upon a high resolution television display such as a cathode ray tube.

Such high definition television systems will, of course, be incompatible with standard NTSC systems. Because of the great number of NTSC television receivers presently installed and in use, it is likely that the implementation of such high definition television systems will be carried forward in a manner which avoids disturbing FCC allocation of existing NTSC terrestrial services. One of the most likely approaches to making terrestrial high definition television available involves assigning presently unused television broadcast channels to high definition television broadcasting. Through the years, the Federal Communications Commission has endeavored to avoid assigning the same television broadcast channels to broadcasters operating in potentially overlapping television service areas. As a result, most areas in the United States have a number of unused television channels available. However, the assignment of such channels to high definition television broadcasters will increase the likelihood of closely spaced or overlapping broadcast areas. In such areas, television receivers may be subjected to two different television broadcast signals on the same broadcast channel. The result of simultaneous reception of two different signals within the same broadcast channel produces an interference problem within the receiver known as co-channel interference. High definition television receivers receiving digitally transmitted signals may be subject to stronger interference signals than receivers receiving NTSC signals and as a result such co-channel interference signals are likely to severely degrade or even disrupt the operation of the high definition television receivers.

Another form of co-channel interference occurs in cable television systems due to a phenomenon known as composite triple beat. A typical cable television distribution system includes a plurality of amplifiers spaced at regular intervals between a cable head-end and remote subscriber locations. The distribution system may accommodate eighty or more 6 MHz television channels in a band between about 50-550 MHz. In processing television signals transmitted over these channels, the distribution amplifiers develop numerous beat components comprising the combination of two or more of the transmitted signals. Of particular concern are the so-called composite triple beats which result from the combination of signals transmitted over three separate channels since these beat components tend to fall within the bandwidth of the transmitted cable spectrum. Moreover, due to the numerous possible combinations, any given cable channel may be exposed to composite triple beats from a large number of sources along the length of the cable plant, the accumulation of which provides an interfering co-channel signal whose average power is largely concentrated at the carrier frequencies of the given cable channel. Cable television channels located near the center of the cable spectrum may, for example, experience co-channel interference resulting from the accumulation of up to about 1,000 different composite triple beats while channels near the opposite ends of the spectrum experience co-channel interference resulting from the accumulation of up to about 500 different composite triple beats.

Composite triple beat induced co-channel interference establishes a major design limitation in current cable systems which may impact the introduction of recently proposed compressed NTSC transmissions. In particular, in order to increase the channel capacity of existing cable television systems it has been proposed to transmit up to four or more compressed NTSC television signals over a single 6 MHz cable television channel. While the composite triple beat induced co-channel interference caused by the additional channels will be somewhat ameliorated by the use of low-level digital transmission technology much the same as has been proposed for high definition television, some adverse co-channel interference effects are nevertheless anticipated.

Since the channel selection tuning mechanisms used in television receivers provide channel selection based upon signal frequency, even the best tuner may not exclude an undesired co-channel signal. There arises, therefore, a need in the art for an effective means for reducing co-channel interference, both in digital high definition television receivers and in cable television signal receivers, especially those designed for receiving digitally encoded compressed NTSC signals.

Accordingly, it is a general object of the present invention to provide an improved television signal receiver. It is a more particular object of the present invention to provide an improved television signal receiver capable of reducing the effects of NTSC co-channel interference without significantly degrading the performance of the receiver.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
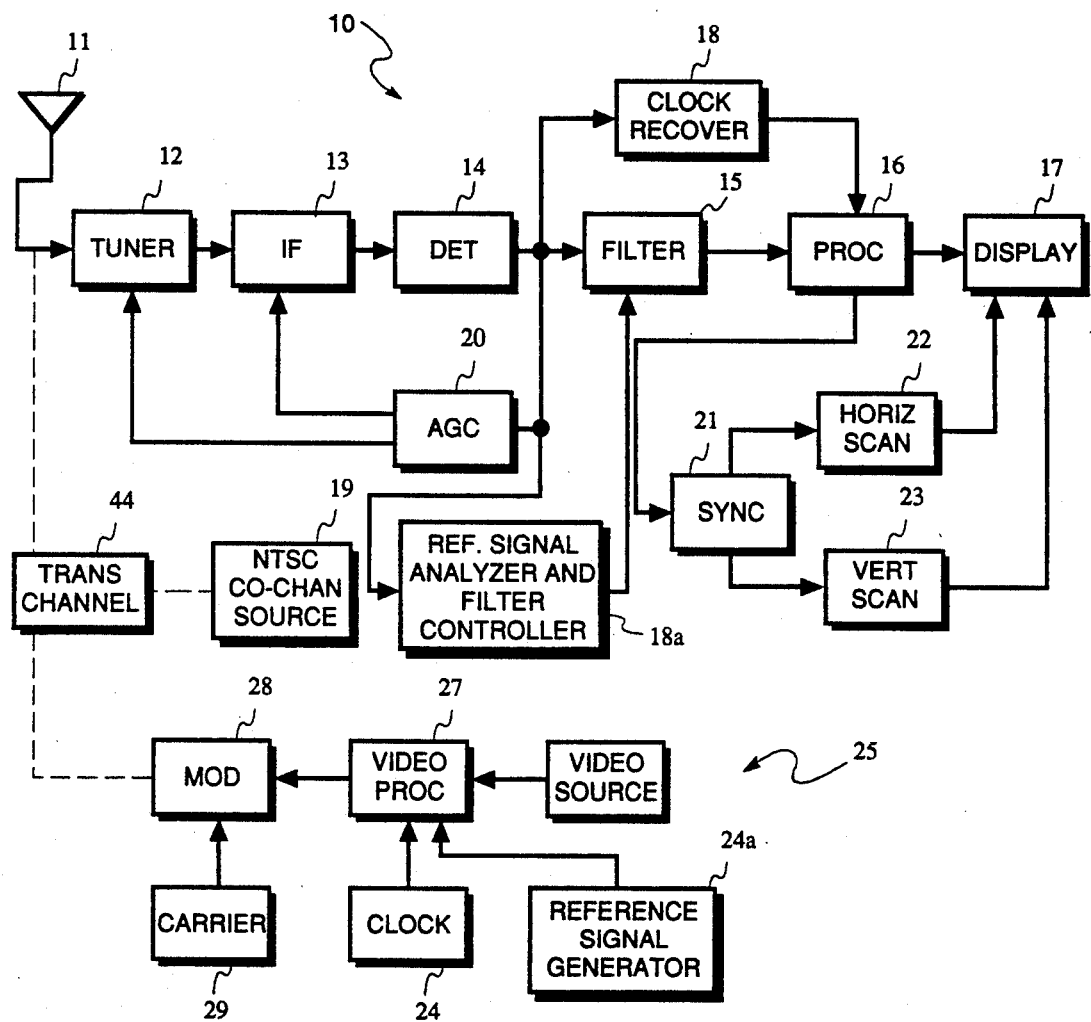
FIG. 1 sets forth a block diagram of a television signal transmission system having a television signal receiver constructed in accordance with the present invention.

FIG. 1 sets forth a block diagram of a television signal transmission system and a television signal receiver constructed in accordance with the present invention with the latter being generally referenced by numeral 10. As will be explained in further detail hereinafter, the system may comprise, for example, a terrestrial high definition television system or a cable television system transmitting either high definition television signals or compressed NTSC television signals.

Referring now in more detail to FIG. 1, a source of video information 26, which may for example comprise a high definition video camera or a source of multiple NTSC video signals, is coupled to a video processor 27. A clock 24 produces a periodic clock signal which is also coupled to video processor 27. The output of video processor 27 is coupled to one input of a modulator 28. A source of carrier frequency signal 29 is coupled to the remaining input of modulator 28. The output of modulator 28 is coupled to a transmission channel 44. Transmission channel 44 may, for example, comprise an over the air broadcast channel or a cable system including a series of spaced amplifiers.

In operation, video processor 27 responds to the clock signal from clock 24 to convert the video information from video source 26 to a digital form and then to compress the digitally encoded video information to an extent sufficient to enable its transmission over a 6 MHz television channel. The compressed video information is preferably provided as a four-level digitally encoded signal at the output of processor 27 which is then modulated upon the carrier signal from source 29 by modulator 28. A sample of the clock signal from clock 24 together with a reference signal from a generator 24a are also included in the output signal of processor 27. As will be seen below, the clock sample permits the establishment of a corresponding clock signal within receiver 10, or while the reference signal, which may comprise, for example, a pseudo random sequence used to control a channel equalizer in receiver 10 or a suitably configured chirp, provides a facility for adaptively controlling the extent of co-channel interference reduction effected in the receiver. The resulting modulated station carrier is then applied to transmission channel 44.

Receiver 10 includes an antenna 11 (or alternatively a cable input) receiving signals from transmission channel 44 and being coupled to a tuner 12. Tuner 12 is coupled to an intermediate frequency amplifier 13, the output of which is coupled to a detector 14. The output of detector 14 is coupled to an automatic gain control 20, the outputs of which are coupled to tuner 12 and intermediate frequency amplifier 13. A filter 15 constructed in accordance with the present invention and set forth below in greater detail couples the output of detector 14 to a signal processor 16. Processor 16 is coupled to a display system 17 and to a synchronizing system 21. A horizontal scan system 22 and a vertical scan system 23 are coupled to display system 17 and to synchronizing system 21.

In operation, the four-level digitally encoded television signal produced by modulator 28 is coupled by transmission channel 44 to antenna 11. A source of NTSC co-channel interference signals 19 is shown coupled to transmission channel 44 to depict the introduction of an NTSC co-channel signal. In a cable television application, the interfering co-channel signal is the result of an accumulation of composite triple beat components as previously described. In either case, the interfering co-channel signal becomes mixed with the desired digitally encoded signal produced by modulator 28. The received signal at antenna 11 comprising both the desired signal and the undesired interfering co-channel signal is frequency converted by tuner 12 to an intermediate frequency signal which is amplified by a plurality of tuned amplifiers within intermediate frequency amplifier 13 to a power level sufficient to drive detector 14. Detector 14 recovers the digitally encoded modulating signal from the intermediate frequency signal and applies it to filter 15. In addition, the recovered digitally encoded signal includes an amplitude reference signal which is processed by automatic gain control 20 to control the gains of tuner 12 and intermediate frequency amplifier 13 to maintain a generally constant signal amplitude at detector 14. The recovered digitally encoded signal also includes the clock sample which is applied to a clock recovery circuit 18 and the reference signal which is applied to a reference signal analyzer and filter controller 18a.

Because interfering co-channel signals are also detected by detector 14, the present invention receiver provides a filter 15 which in accordance with the operation set forth below in greater detail, is operative upon the detected digitally encoded signal produced by detector 14 to remove co-channel interfering signals and to apply the filtered signal to signal processor 16. Processor 16 performs the necessary decompression process and digital to analog conversion to convert the digitally encoded input signal to a high frequency analog picture information signal suitable for display by display system 17. In its preferred form, display system 17 may include a high resolution cathode ray tube and appropriate display amplifiers. Horizontal scan 22 and vertical scan 23 provide sequential raster scanning of the cathode ray tube within display 17. Synchronizing system 21 receives a plurality of synchronizing signals from processor 16 and in response thereto properly times or synchronizes the operations of horizontal scan 22 and vertical scan 23.

Figure 2:
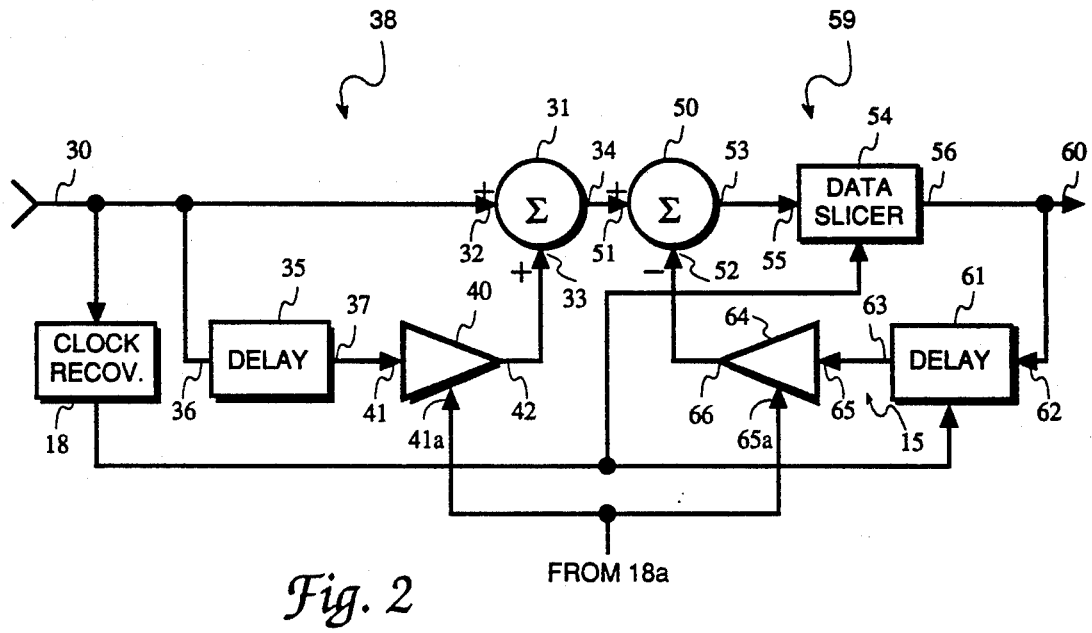
FIG. 2 sets forth a block diagram of the present invention co-channel interference filter.

FIG. 2 sets forth a block diagram of filter 15 constructed in accordance with the present invention. Filter 15 comprises a series combination of a comb filter 38 and an intersymbol interference filter 59. Comb filter 38 is operative to reduce the co-channel interference signal at input 30. However, during this co-channel signal reduction, an undesired intersymbol interference signal is produced within comb filter 38. Intersymbol interference filter 59 is operative to remove this intersymbol interference signal. Comb filter 38 includes a summer network 31 having a positive input 32 coupled to data input 30, a positive input 33, and an output terminal 34. A delay network 35 has an input 36 coupled to data input terminal 30 and an output 37. A variable gain amplifier 40 has an input 41 coupled to output 37 of delay network 35, a control input 41a coupled to reference signal analyzer 18a and an output 42 coupled to positive input 33 of summer 31. The gain of amplifier 40 is preferably variable between 1 and 0 in response to a gain control signal provided at input 41a.

Intersymbol interference filter 59 includes a summer 50 having a positive input 51 coupled to output 34 of summer 31, a negative input 52, and an output 53. A data slicer 54 has an input 55 coupled to output 53 of summer 50 and an output 56 coupled to a data output terminal 60. A delay network 61 has an input 62 coupled to output 56 of data slicer 54 and an output 63. A variable gain amplifier 64 has an input 65 coupled to output 63 of delay network 61, a control input 65a for receiving the gain control signal from reference signal analyzer 18a and an output 66 coupled to negative input 52 of summer 50. Data input 30 is coupled to detector 14 (seen in FIG. 1) while data output 60 is coupled to processor 16 (also seen in FIG. 1). Clock recovery circuit 18 is coupled to input 30 and produces a clock signal corresponding to clock 24 within the station transmitter which is coupled to delay 61 and data slicer 54.

In operation, comb filter 38 and intersymbol interference filter 59 combine to first attenuate the co-channel interference signal and thereafter remove the intersymbol interference signal produced by comb filter 38. Specifically, the digitally encoded data input signal at terminal 30 is applied directly to input 32 of summer 31 and to delay network 35. Because the anticipated co-channel interference signal sought to be reduced by filter 15 if of an NTSC form and thus exhibits energy clustering at the NTSC periodicity rates, delay 35 is selected to produce a signal delay precisely equal to a selected NTSC periodicity characteristic. For example, delay 35 may be selected to correspond to the time interval of a horizontal scan period, a vertical scan period, or a vertical frame interval. In any event, the delay thus selected frequency spaces the nulls of the comb filter response (shown in FIG. 3) in a frequency spacing corresponding to the clustering of the interfering co-channel signal. To maximize the effectiveness of comb filter 38, carrier source 29 (seen in FIG. 1) may be frequency offset from the standard channel frequency by an odd multiple of one half the selected NTSC periodicity. The delayed signal is amplified by variable gain amplifier 40 and applied to input 33 of summer 31. To maintain stability of filter 15 and prevent undesired oscillations, the gain of amplifier 40 is controlled to produce a feed forward gain of less than one. The input signals at inputs 32 and 33 are added in summer 31 and coupled to input 51 of summer 50. Summer 31, delay network 35 and amplifier 40 form a comb filter network having the frequency response set forth in FIG. 3.

Figure 3:
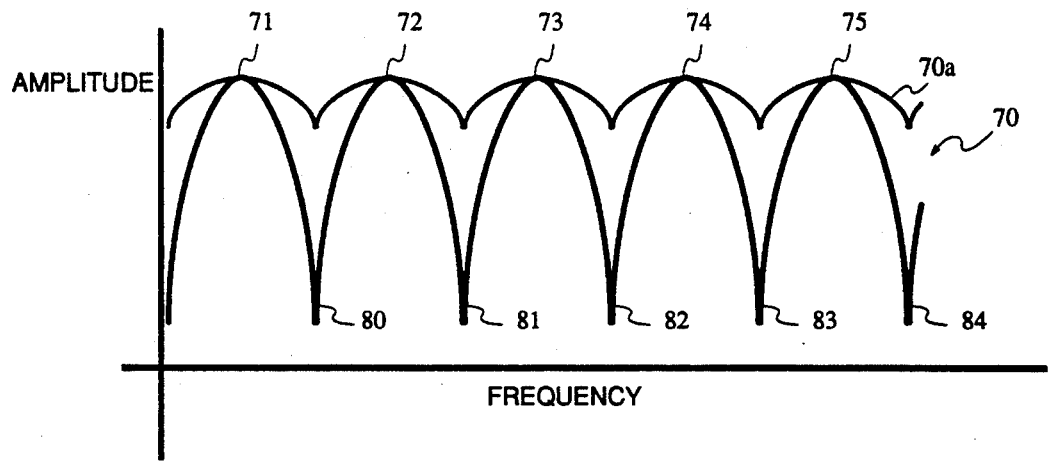
FIG. 3 sets forth a pair of filter response curves for a portion of the present invention co-channel interference filter.

With reference to FIG. 3, the frequency response of comb filter 38 with the gain of amplifier 40 equal to one is set forth as curve 70. Curve 70 defines a conventional comb filter response characterized by a plurality of peak responses 71, 72, 73, 74 and 75 and interleaved nulls 80, 81, 82, 83 and 84. It should be apparent to those skilled in the art that curve 70 sets forth a representative frequency response which theoretically continues indefinitely beyond null 84. In addition, the relative difference in response amplitude of curve 70 between peak responses 71 thorough 75 and nulls 80 through 84 is determined in part by the gain of amplifier 40. As amplifier 40 approaches a signal gain of one, nulls 80–84 approach their maximum attenuation with respect to peak amplitudes 71–75, as illustrated by curve 70. However, as the gain of amplifier 40 approaches zero, nulls 80-84 approach minimum attenuation relative to peak amplitudes 71-75 as represented by curve 70a. When the above-described frequency offset of carrier source 29 (seen in FIG. 1) is maintained, the energy clusters of the interfering NTSC signal tend to coincide with the nulls of the comb filter response and are, as a result, substantially attenuated.

As mentioned above, setting the gain of amplifier 40 to one effects maximum reduction of the interfering co-channel signal. However, at the same time, the signal-to-noise ratio of the desired digitally encoded signal is degraded by a factor of up to 3 db. If a relatively strong co-channel interfering signal is present this is a desirable tradeoff. In the absence of an interfering co-channel signal, or in the presence of weak interference, this trade-off looses its advantage and unnecessarily degrades receiver performance. Thus, according to the present invention the gain of amplifier 40 is adaptively controlled so that an optimum balance is effected between attenuation of the interfering co-channel signal and the resulting signal-to-noise ratio degradation. In particular, when a received signal is characterized by relatively strong co-channel interference, the gain of amplifier 40 is increased towards its maximum level of one to deepen nulls 80-84 and thereby effect maximum attenuation of the interfering signal. While signal-to-noise performance is somewhat degraded (i.e. up to 3 db), the tradeoff is nevertheless considered desirable. However, as the strength of the interfering co-channel signal decreases, the gain of amplifier 40 is decreased proportionately towards its minimum level of zero. While this reduces the depth of nulls 80-84 thereby decreasing the degree of attenuation effected by comb filter 38, the degradation in signal-to-noise performance is also proportionately reduced. Thus, a trade-off between interference cancellation and signal-to-noise performance is effected to optimize system performance.

The gain of amplifier 40 is preferably controlled in response to the received reference signal. More specifically, the received reference signal developed at the output of detector 14 is applied to reference signal analyzer and filter controller 18a. Controller 18a analyzes the received reference signal to determine the extent to which it has been disturbed by co-channel interference (e.g. composite triple beat in a cable system). In response thereto, controller 18a generates and applies an output gain control signal to input 41a of amplifier 40 which is related to the strength of the received co-channel interference. In this manner, the gain of amplifier 40 is directly controlled to effect the tradeoff between co-channel interference cancellation and signal-to-noise performance as described above.

As mentioned previously, the output of comb filter 38 includes an intersymbol interference component which is cancelled by intersymbol interference filter 59. In order to insure matched operation of the two filters, the gain of amplifier 64 is preferably controlled in response to the same gain control signal used to control the gain of amplifier 40 so that the gains of the two amplifiers track each other for providing a virtually interference free output signal at terminal 60.

More specifically, and with further reference to FIG. 2, the output signal of comb filter 38 is applied to input 51 of summer 50. The output of summer 50 is coupled to data slicer 54 and processed therein in accordance with the four level input data system described below in connection with FIGS. 6 and 7. Suffice it to note here, however, the the comb filtered data signal is further coupled to output terminal 60 by data slicer 54. In addition, the output signal of data slicer 54 is fed back to negative input 52 of summer 50 by the series combination of delay 61 and variable gain amplifier 64. Delay 61 is selected to provide a signal delay equal to that of delay 35 which, as is mentioned above, is preferably equal to one interval of the selected NTSC periodicity. To facilitate this precise delay, the frequency of clock 24 (seen in FIG. 1) and the clock signal produced by clock recovery 39 is precisely maintained at a multiple of the selected NTSC periodicity. The gain of amplifier 64 is controlled by the gain control signal at input 65a.

To prevent the circulation of noise within filters 38 and 59, delays 35 and 61 are configured as filters having noise bandwidths less than a television channel bandwith. For example, delays 35 and 61 may have noise bandwidths of approximately three megahertz (i.e. one-half of six megahertz).

Figure 4:
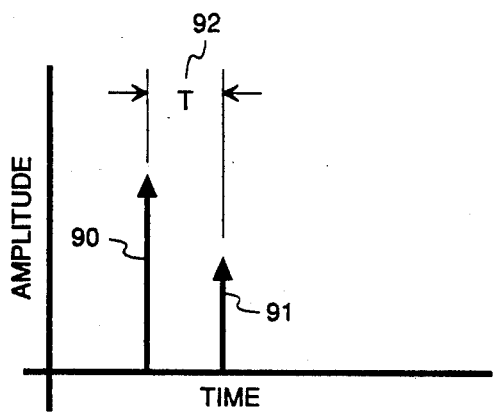
FIGS. 4 and 5 set forth impulse response diagrams of portions of the present invention co-channel interference filter.

FIG. 4 sets forth the impulse response of comb filter 38 as can be seen by examination of FIG. 4. Comb filter 38 responds to the input data signal by producing an output having the input data signal 90 together with an intersymbol interference signal 91. As can be seen in FIG. 4, intersymbol interference signal 91 is reduced in amplitude from data input signal 90 and delayed in time by a time interval 92. In accordance with the characteristics of a comb filter of the type formed by comb filter 38, time delay 92 corresponds to the delay interval of time delay 35. Because most of the energy of the interfering co-channel NTSC signals is centered at the nulls of the comb filter response, comb filter 38 substantially attenuates the received interference. While comb filter 38 is effective to substantially reduce or eliminate NTSC co-channel interference, its comb filter characteristic also produces an undesired intersymbol interference signal 91. This intersymbol interference signal is removed by filter 59.

Figure 5:
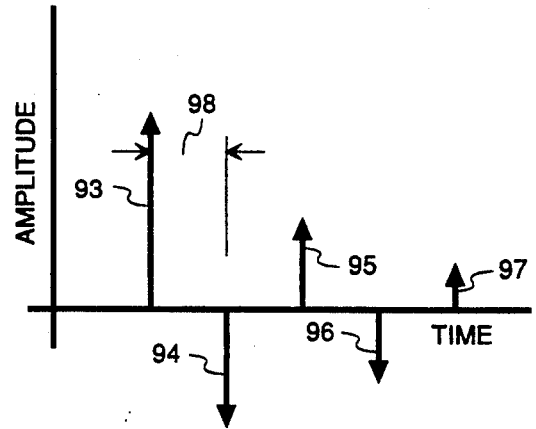

FIG. 5 sets forth the impulse response of filter 59. As can be seen, filter 59 in response to an input data signal 93 produces a negative replica 94 of intersymbol interference signal 91 produced by filter 38. Negative replica 94 cancels intersymbol interference signal 91. Filter 59 also produces a diminishing series of alternating polarity replicas of intersymbol interference signal 91 shown as response components 95, 96 and 97. Thus, in accordance with the invention, the series combination of filters 38 and 59 permits the response of filter 59 to effectively cancel the intersymbol interference signal 91 created by filter 38. As a result, the overall response of filters 38 and 59 is substantially free of both NTSC co-channel interfering signals and intersymbol interfering signals.

Figure 6:
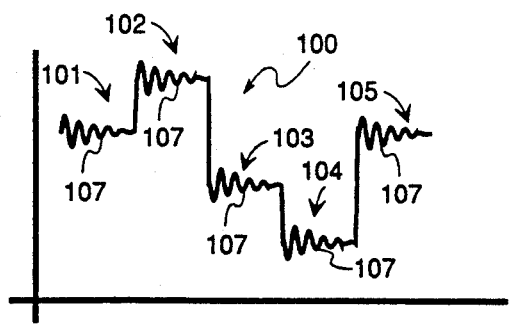
FIG. 6 sets forth an exemplary input data signal for the present invention co-channel interference filter.
Figure 7:
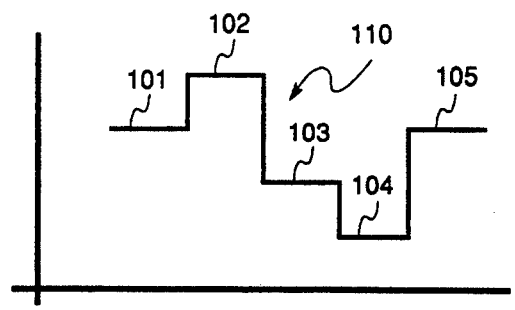
FIG. 7 sets forth an exemplary output signal of the present invention co-channel interference filter from which noise has been removed.

FIG. 6 sets forth a four level input data signal of the type normally processed by television receiver 10 and generally referenced by numeral 100. Signal 100 includes successive signal components 101, 102, 103, 104 and 105 at various data signal levels. Signal components 101 and 105 are shown at the same data signal level. A noise component 107 is also shown riding upon signal 100. When a signal of the type shown as waveform 100 in FIG. 6 is applied to input 30 of filter 15, the output signal of filter 38 will comprise the combination of waveform 100, an intersymbol interference signal in its delayed and attenuated form, and signal noise. This filter output signal is applied to data slicer 54 which resolves the signal into a corresponding four state signal shown in FIG. 7 and generally referenced by numeral 110. Signal 110 is delayed and attenuated by delay 61 and amplifier 64 and subtracted from the input signal at input 51 of summer 50 to provide cancellation of the intersymbol interfering signal. Because noise signal 107 is not resolved by data slicer 54, a clean output signal is produced at output 60 which is relatively free of NTSC co-channel interference signals, intersymbol interference signals, and noise.

It will be apparent to those skilled in the art that while the system set forth herein utilizes a four level data signal, the present invention co-channel interference filter may be utilized in other digital systems using other digital encoding formats.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method of reducing the amplitude of co-channel interference in a television signal receiver comprising the steps of:
   receiving a digitally encoded television signal including undesired co-channel interference on a selected television channel;
   determining the relative strength of said undesired co-channel interference;
   comb filtering said received signal according to said determined relative strength for providing an output signal having a reduced level of undesired co-channel interference and being characterized by an intersymbol interference component; and
   filtering said output signal according to said determined relative strength to reduce said intersymbol interference component.

2. The method of claim 1 wherein said receiving step comprises receiving a digitally encoded television signal including a predetermined reference signal and wherein said determining step comprises analyzing said received reference signal for determining the relative strength of said undesired co-channel interference.

3. The method of claim 2 wherein said comb filtering step comprises establishing a comb filter response having a plurality of spaced nulls for attenuating said undesired co-channel interference, the depth of said nulls being a function of said determined relative strength.

4. The method of claim 3 including establishing the depth of said comb filter response nulls as a direct function of said determined relative strength.

5. For use in a television signal receiver, a co-channel interference filter comprising:

means for receiving a digitally encoded television signal transmitted over a selected television channel, said received signal including a predetermined reference signal and being characterized by undesired co-channel interference;

means responsive to said reference signal for developing a control signal representing the relative strength of said undesired co-channel interference;

first filter means coupled to said means for receiving and being responsive to said control signal for reducing said undesired co-channel interference and for providing an output signal including an intersymbol interference component in response to said digitally encoded signal; and an intersymbol interference filter coupled to said first filter means and being responsive to said control signal for reducing said intersymbol interference component of said output signal for reconstructing said digitally encoded signal.

6. The co-channel interference filter of claim 5 wherein said first filter means comprises a comb filter having a plurality of spaced nulls for attenuating said undesired co-channel interference, the depth of said nulls being established in response to said control signal.

7. The co-channel interference filter of claim 6 wherein the depth of said comb filter nulls are established in direct relation to the strength of said undesired co-channel interference as represented by said control signal.

8. The co-channel interference filter of claim 7 wherein said comb filter comprises a feed-forward path including a variable gain amplifier responsive to said control signal.

9. The co-channel interference filter of claim 8 wherein said intersymbol interference filter comprises a feedback path including a second variable gain amplifier responsive to said control signal.

10. The co-channel interference filter of claim 9 wherein the gain of said first amplifier is variable in response to said control signal between a level of about one for establishing the depth of said nulls at a maximum value and a level of about zero for establishing the depth of said nulls at a minimum value.

11. The co-channel interference filter of claim 5 wherein said reference signal comprises a pseudo random code for use in controlling a channel equalizer.

12. The co-channel interference filter of claim 5 wherein said reference signal comprises a chirp signal.

13. The co-channel interference filter of claim 5 wherein said means for receiving is coupled to a cable television network and wherein said undesired co-channel interference is produced as the result of composite triple beats developed in said network.

* * * * *